United States Patent [19]

Gross et al.

[11] Patent Number: 5,286,536
[45] Date of Patent: Feb. 15, 1994

[54] INDENTATION-RECOVERABLE MOLDING STRIP

[75] Inventors: Michael G. Gross, Tipp City; Jack D. Young, Huber Heights, both of Ohio

[73] Assignee: Creative Extruded Products, Inc., Tipp City, Ohio

[21] Appl. No.: 22,482

[22] Filed: Feb. 19, 1993

[51] Int. Cl.⁵ ............................. B60R 13/04
[52] U.S. Cl. ............................. 428/31; 52/716.5; 293/128
[58] Field of Search ............ 428/31; 52/716.5; 293/128

[56] References Cited

U.S. PATENT DOCUMENTS 4,569,880 2/1986 Nishiyama et al. ............ 428/158 X
4,965,103 10/1990 Roberts et al. ................. 428/31

Primary Examiner—Henry F. Epstein
Attorney, Agent, or Firm—Reuben Wolk

[57] ABSTRACT

A decorative molding strip for automobiles and the like, consisting of a polymeric body member having a stabilizing layer imbedded therein. One surface of the strip is mounted on a portion of an auto, for example, such as a bumper or a side panel, and the opposite surface is exposed and subject to impact from an outside source. The layer is made of a woven fabric, preferably of glass fibers, and allows the surface which has been impacted to recover from indentation, thus preserving the original smooth and unblemished appearance.

5 Claims, 1 Drawing Sheet

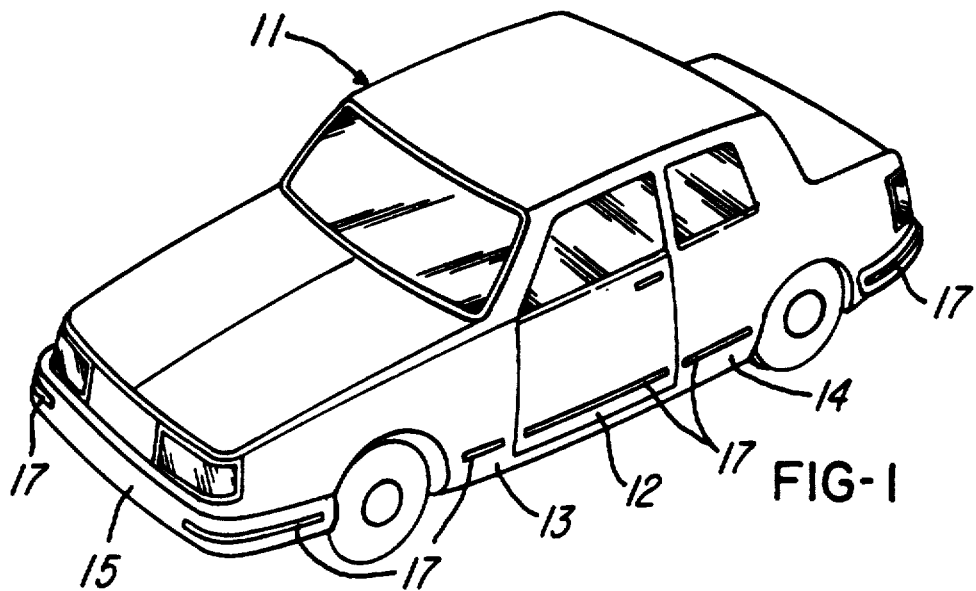
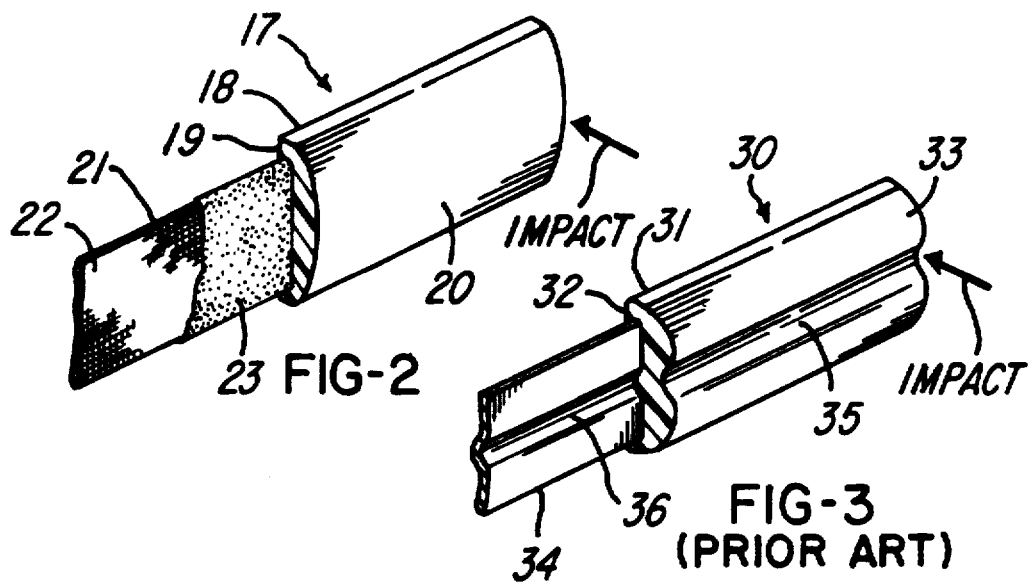

INDENTATION-RECOVERABLE MOLDING STRIP

BACKGROUND OF THE INVENTION

This invention relates to a decorative molding strip which is applies to a bumper as a fascia molding, or to the side body, of an automobile, or to other surfaces.

PRIOR ART STATEMENT

It is known to form decorative molding of the type set forth herein, such as shown in the patent to Roberts et al, Ser. No. 4,965,103, wherein a plastic body is formed with a metal reinforcing strip imbedded therein to stabilize the molding. However, such moldings are not always satisfactory because when mountell on an auto they may be impacted by another auto and become dented. When the source of the impact is removed, the dent remains permanent, resulting in an unsightly appearance of the exposed outer surface of the molding.

SUMMARY OF THE INVENTION

This invention represents an improved decorative molding strip which is intended to be applied to such exposed areas as the bumper fascia or the side bodies of an automobile. These strips provide an important function of protecting the adjacent areas, as well as having decorative features. The strip principally comprises a polymeric member, such as polyvinyl chloride, and a layer of woven fabric, preferably made of glass fibers, acting as a reinforcing or stabilizing means imbedded in the member. The problem of permanent dents referred to above is overcome by such a construction. The layer and member cooperate to permit recovery from the indentations caused by outside impacts, so that the outer surface of the strip has the same smooth, unblemished appearance as it did prior to the impacts. The material used for the layer also has the added advantage of eliminating shrinkage which is inherent in other types of material. The strip is made by first coating the woven layer with a material such as polyvinyl acetate, to improve the bonding or adhesion of the layer to the surrounding polymeric member. The resulting product has been subjected to automotive impact tests and has been found to be acceptable by the industry.

Accordingly, it is a principal object of the invention to provide a decorative molding strip which is indentation-recoverable after an impact.

It is a further object to provide such a strip whose outer surface will retain a smooth unblemished appearance after the source of impact has been removed.

It is a further object to provide a stabilizing layer providing the above results.

It is another object to manufacture the strip in a simple and inexpensive manner.

These and other objects and features of the invention will become more readily apparent from the preferred embodiment described and shown herein.

BRIEF DESCRIPTION OF THE DRAWINGS

FIG. 1 is a perspective view of a typical automobile illustratimg various locations of the novel molding strip.

FIG is a perspective broken view of the novel molding strip, both before and after impact.

FIG. 3 is a perspective broken view of a molding strip which is typical of the prior art, after impact.

DESCRIPTION OF THE PREFERRED EMBODIMENT

FIG. 1 illustrates a typical automobile 11 including a door 12, front and rear body panels 13 and 14, a front bumper 15 and a rear bumper 16. The novel molding strip 17 is shown mounted on the front and rear bumpers as bumper fascia, and on the door and body panels as side moldings. As is well known to the purchasing public, these strips provide a decorative function on virtually all autos.

As shown in FIG. 2, the molding strip 17 is formed of a principal member 18 composed of a polymeric material such as polyvinyl chloride, and may be made in various configurations according to the requirements of the auto manufacturer. The strip has a flat planar surface 19 and a non-planar curved opposite surface 20 which may be of any shape that is desired. A reinforcing layer 21 is imbedded within the member 18 and serves as a stabilizer, this layer extending along the longitudinal axis of the member. The layer is made of a woven fabric 21. whose threads are glass fibers (commonly known as "Fiberglass"), and the surfaces of the fabric are preferably coated with a material such as polyvinyl acetate, designated by reference number 23. This layer is approximately 0.025 inches thick, and the width depends on the desired dimension of the molding strip. The layer is formed and coated in a continuous length. The strip is formed in an extruder well known in the art, wherein the coated reinforcing layer 1.1 is fed continuously into the extruder, and the polymeric material is extruded around it to form the member 18. This imbeds the layer within the member, and the coating 23 on surfaces of the fabric improves the adhesion of the layer within the member. This is due to the inherent compatibility of the coating material and the polymeric material of the member. The extrusion process is completed and the strip is then removed from the extruder, the strip is cooled, an adhesive is applied to the surface 19 and a strappable tape (not shown) is applied over the adhesive, This enables the strip to be mounted on the bumpers or sides in the conventional manner. Finally, the strip is cut into lengths as required by the customer.

It is important to provide a molding strip that has a minimal shrinkage in a longitudinal direction, so that the strip is stable. At the present time, this must be done by a costly and time-consuming annealing process when metal stabilizers are used. However, fabric woven of glass fibers provides an ideal material for use as a stabilizer in the strip. Automobile manufacturers require that the strip must have a shrinkage of less than 1% when exposed to a temperature of 158 degrees F. To meet this requirement, applicants test their novel strip by cutting a length of molding and measuring it at ambient temperature, then subjecting it to a temperature of 190 degrees F. (exceeding the requirements), and measuring it again to determine the amount of shrinkage. For example, a strip is cut to 8.00 inches in length at ambient temperature, and placed in a 190 degree F. oven for 30 minutes. Upon measurement, its length was 7.99 inches, meaning that the shrinkage was only 0.01 inches, or 0.125% of the original. length. Expressed as a decimal, this represents 0.00125 times the original length at ambient temperature. This far exceeds the manufacturer's requirements.

The novel molding strip represents an important step forward in the art, because it has proven to be recoverable from impacts by outside sources. The conventional strip has an aluminum reinforcement, such as shown in the above mentioned patent to Roberts et al, but because metals such as aluminum are permanently deformed under impact, they must be frequently replaced, which is costly, or allowed to remain in place with its unsightly indentations. This appearance is all too common on our everyday automobiles. FIG. 3 illustrates a typical prior art molding strip 30 having a body 31, a planar surface 32 and an opposite exposed surface 33. A reinforcement 34 is imbedded within the body. Impact on the surface 33 creates an indentation 35 on the surface and an adjacent indentation 36 in the reinforcement. Because of the non-resilient nature of metal, the indentation 36 remains permanent; and because the reinforcement is fully imbedded the body 31, the adjacent indentation 35 also remains permanent. The comparative rigidity of the reinforcement overcomes any inherent resilience of the body.

Another important advantage of applicants' product involves the cutting of the strip to final length, as referred to above. A strip with metal reinforcing layers requires cutting devices capable of shearing metal, whereas the pliant reinforcing material of the applicants permits the use of simpler cutters and also promotes faster operation.

Thus, applicants' molding strip is one that can be made efficiently and inexpensively. The reinforcing layer cooperates with its surrounding body member to absorb impacts on the exposed smooth and unblemished outer surface which would tend to form indentations on tile surface, thus permitting the surface to recover from the impacts return to its normal configuration when the source of impacts is removed.

The specific embodiment shown here is exemplary, and other embodiments may be made which fall within the spirit of the invention.

We claim:

1. An indentation-recoverable molding strip having a first first surface adapted to be mounted on a body, and an opposite exposed surface; the improvement wherein strip comprises a polymeric member and a woven fabric reinforcing layer extending along the longitudinal axis of said member and imbedded therein, said layer having a coating on its surfaces for improved adhesion of said layer within said member, said strip having a shrinkage no greater than 0.125% in a longitudinal direction when exposed to a temperature of 190 degrees F.

2. The strip of claim 1 wherein said fabric is made of glass fibers.

3. The strip of claim wherein said coating is a polyvinyl acetate.

4. The strip of claim 1 wherein said member is an extruded polyvinyl chloride, said layer being imbedded within said member during extrusion thereof.

5. The strip of claim 1 wherein said exposed surface of said strip has a normal smooth and unblemished appearance, said layer cooperating with said member to absorb impacts which tend to form indentations on said exposed surface and permitting said exposed surface to return to its normal smooth and unblemished appearance when the source of said impacts is removed.

* * * * *